(12) United States Patent
Hulway

(10) Patent No.: US 9,090,187 B2
(45) Date of Patent: Jul. 28, 2015

(54) BUTTON-TUFTED TRIM STYLE FOR CLIMATE COMFORT SEAT

(71) Applicant: Ford Global Technologies, LLC, Dearborn, MI (US)

(72) Inventor: Michael Hulway, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/039,021

(22) Filed: Sep. 27, 2013

(65) Prior Publication Data

US 2015/0091340 A1   Apr. 2, 2015

(51) Int. Cl.
*A47C 7/72*   (2006.01)
*A47C 31/00*  (2006.01)
*B60N 2/56*   (2006.01)

(52) U.S. Cl.
CPC ............. *B60N 2/5621* (2013.01); *B60N 2/5657* (2013.01)

(58) Field of Classification Search
CPC ...... B60N 2/58; B60N 2/5621; B60N 2/5657; B29L 2031/771
USPC ............. 297/180.14, 452.47, 180.13, 452.42, 297/452.46, 452.45
See application file for complete search history.

(56) References Cited

U.S. PATENT DOCUMENTS

| 3,736,022 | A | | 5/1973 | Radke | |
|---|---|---|---|---|---|
| 4,413,857 | A | | 11/1983 | Hayashi | |
| 5,106,161 | A | * | 4/1992 | Meiller | 297/452.46 |
| 5,924,766 | A | | 7/1999 | Esaki et al. | |
| 6,062,641 | A | | 5/2000 | Suzuki et al. | |
| 6,196,627 | B1 | | 3/2001 | Faust et al. | |
| 6,273,810 | B1 | * | 8/2001 | Rhodes et al. | 454/120 |
| 6,291,803 | B1 | * | 9/2001 | Fourrey | 219/497 |
| 6,478,369 | B1 | * | 11/2002 | Aoki et al. | 297/180.13 |
| 6,541,737 | B1 | | 4/2003 | Eksin et al. | |
| 6,685,553 | B2 | * | 2/2004 | Aoki | 454/120 |
| RE39,394 | E | | 11/2006 | Suzuki et al. | |
| 7,461,892 | B2 | * | 12/2008 | Bajic et al. | 297/180.16 |
| 2002/0096915 | A1 | * | 7/2002 | Haupt et al. | 297/180.13 |
| 2005/0188849 | A1 | * | 9/2005 | Yoneno et al. | 96/143 |
| 2014/0110978 | A1 | * | 4/2014 | Schneider | 297/180.1 |
| 2015/0035323 | A1 | * | 2/2015 | Diop et al. | 297/180.14 |
| 2015/0069811 | A1 | * | 3/2015 | Sachs et al. | 297/423.1 |

* cited by examiner

*Primary Examiner* — Chi Q Nguyen
(74) *Attorney, Agent, or Firm* — Vichit Chea; Price Heneveld LLP

(57) ABSTRACT

A vehicle seating assembly includes a seat base and a seat back. A coverstock is disposed over the seat base and the seat back. A plurality of button-tufts are disposed on a top surface of at least one of the seat base and the seat back and are operably coupled with the coverstock. The plurality of button-tufts include an orifice extending through the button-tufts. A fan is in communication with the orifice and is configured to move air through the orifice, thereby providing air flow to a vehicle passenger resting on the coverstock.

18 Claims, 3 Drawing Sheets

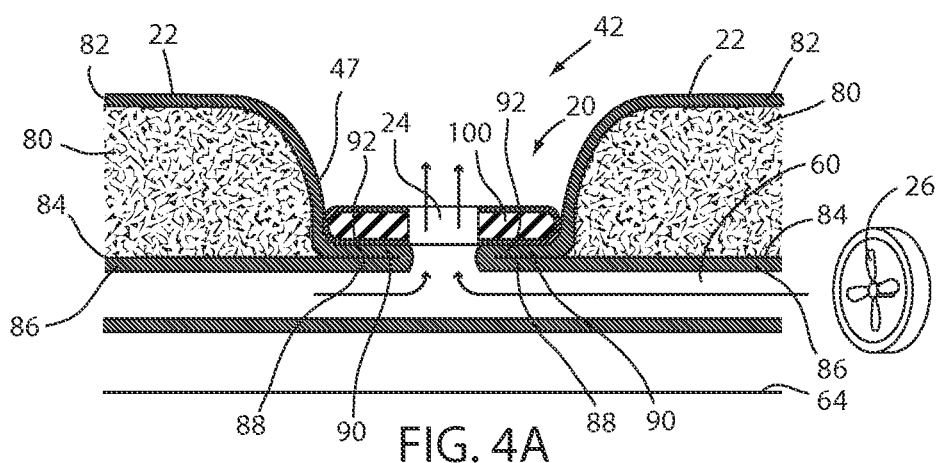
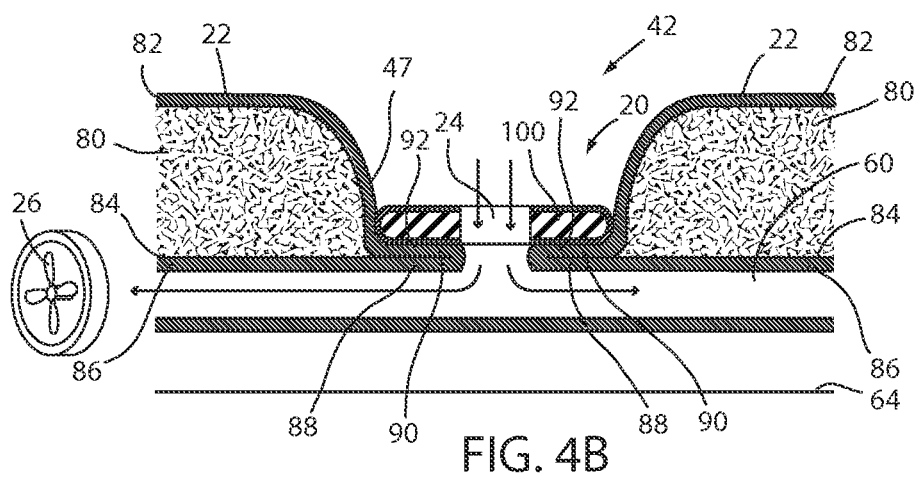
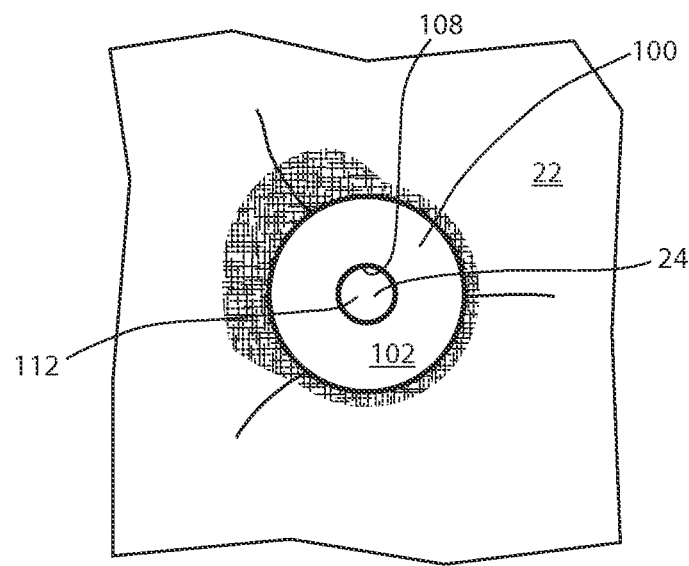

BUTTON-TUFTED TRIM STYLE FOR CLIMATE COMFORT SEAT

FIELD OF THE INVENTION

The present invention generally relates to a vehicle seating assembly, and more particularly to a vehicle seating assembly having a button-tuft vented system, which is configured to provide air flow to a vehicle passenger.

BACKGROUND OF THE INVENTION

Vehicles that include improved air flow technology increase comfort and value to the consumer.

SUMMARY OF THE INVENTION

According to one aspect of the present invention, a vehicle seating assembly includes a seat base and a seat back. A coverstock is disposed over the seat base and the seat back. A plurality of button-tufts are disposed on a top surface of at least one of the seat base and the seat back and are operably coupled with the coverstock. The plurality of button-tufts include an orifice extending through the button-tufts. A fan is in communication with the orifice and is configured to move air through the orifice, thereby providing air flow to a vehicle passenger resting on the coverstock.

According to another aspect of the present invention, a vehicle seating assembly includes a seat base and seat back defining a seating surface. A button-tuft is disposed on the seat base. The button-tuft includes an orifice. A lateral air channel is in communication with the orifice. A fan is configured to move air through the orifice.

According to yet another aspect of the present invention, a vehicle seating assembly includes a seat base and a seat back. A plurality of button-tufts are disposed on the seat base and seat back. At least one orifice extends through the button-tufts. A fan is operably coupled to the at least one orifice and is configured to blow air through the seat base and seat back.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4A is a side cross-sectional view of a portion of the button-tuft vented system of FIG. 3;

FIG. 4B is a side cross-sectional view of a portion of the button-tuft vented system of FIG. 3;

FIG. 5 is a top plan view of a portion of the button-tuft vented system of FIG. 3;

DETAILED DESCRIPTION OF EMBODIMENTS

Figure 1:
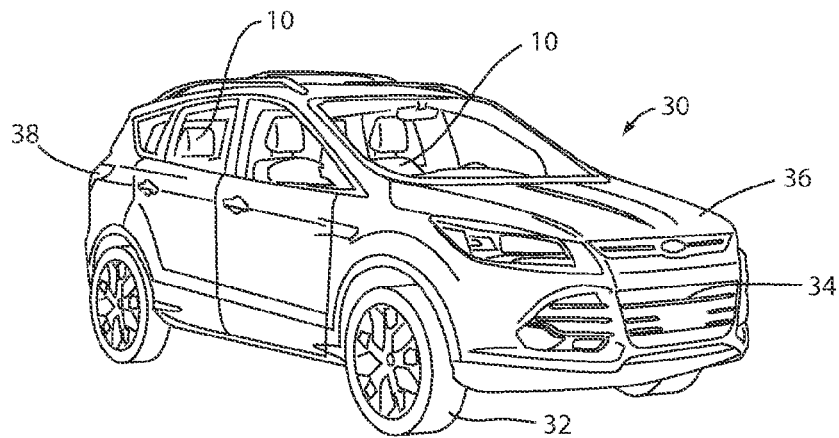
FIG. 1 is a front perspective view of a vehicle having a vehicle seating assembly according to one embodiment of the present invention.
Figure 2:
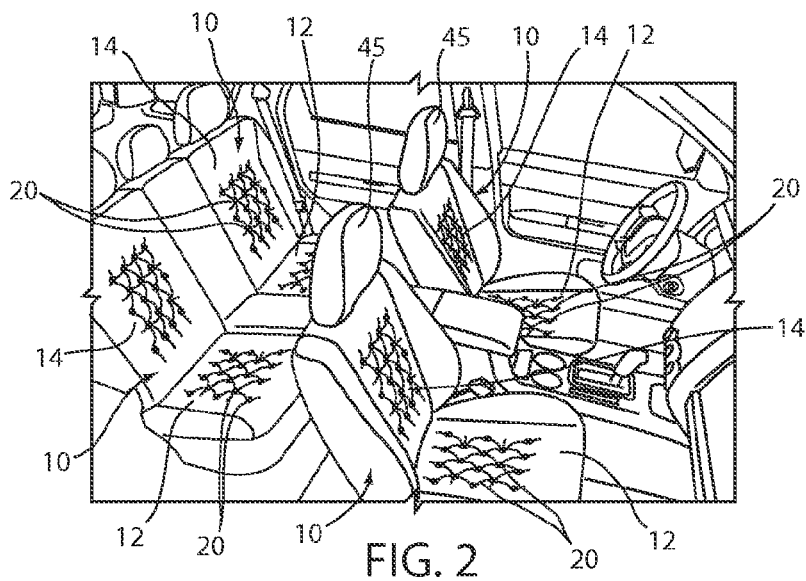
FIG. 2 is a front perspective view of an interior of the vehicle seating assembly of FIG. 1.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-7, reference numeral 10 generally designates a vehicle seating assembly including a seat base 12 and a seat back 14. A coverstock 16 is disposed over the seat base 12 and the seat back 14. A plurality of button-tufts 20 are disposed on a top surface 22 of at least one of the seat base 12 and the seat back 14 and are operably coupled with the coverstock 16. The plurality of button-tufts 20 include an orifice 24 extending through the button-tufts 20. A fan 26 is in communication with the orifice 24 and is configured to move air through the orifice 24, thereby providing air flow to a vehicle passenger resting on the coverstock 16.

Referring again to FIG. 1, a vehicle 30 includes the vehicle seating assembly 10 and also includes other features, such as multiple wheels 32, a bumper 34, a front end 36, and a rear end 38. The vehicle 30 may be of any type, including a compact vehicle, a mid-size vehicle, a sport utility vehicle, a mini or full size van, or any type of truck. As illustrated in the embodiment shown in FIG. 2, an interior 40 of the vehicle 30 may include multiple vehicle seating assemblies 10. The vehicle seating assembly 10 may be a driver seat, a front passenger seat, or any rear passenger vehicle seat. Additionally, the interior 40 of the vehicle 30 may include other features such as a glove box, a steering wheel, seat restraints, and a center console used for passenger storage. In the illustrated embodiment, the vehicle seating assembly 10 includes the plurality of button-tufts 20. The button-tufts 20 may be operably coupled with a button-tuft vented system 42. Moreover, the button-tuft vented system 42 may be operably coupled with any or all of the driver seat, the front passenger seat, or any rear passenger seat.

Figure 3:
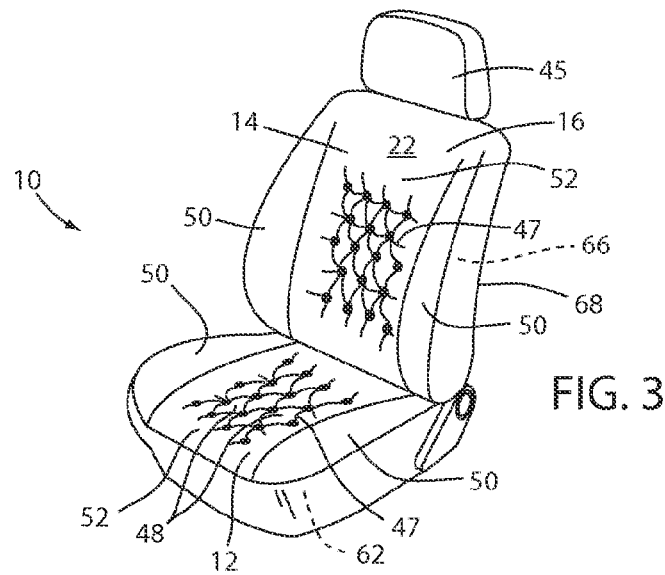
FIG. 3 is a front perspective view of the vehicle seating assembly of FIG. 2 having a button-tuft vented system.

Referring now to the embodiment shown in FIG. 3, the vehicle seating assembly 10 includes the seat base 12 and the seat back 14. In the illustrated embodiment, each of the seat base 12 and the seat back 14 includes the button-tufts 20 and the button-tuft vented system 42. The vehicle seating assembly 10 may also include a headrest 45 and the coverstock 16. The coverstock 16 is disposed completely over the seat back 14 and the seat base 12. The coverstock 16 is configured to provide a uniform look and feel to the vehicle seating assembly 10. The coverstock 16 also forms a passenger engagement surface on the top surface 22 of both the seat back 14 and the seat base 12 of the vehicle seating assembly 10.

Additionally, as shown in the embodiment illustrated in FIG. 3, the seat base 12 and the seat back 14, include multiple button-tufts 20. In the embodiment shown in FIG. 3, the vehicle seating assembly 10 includes an alternating pattern of four button-tufts 20 across followed by three button-tufts 20 across. The seat back 14 includes five rows of this staggered pattern. As such, the embodiment shown in FIG. 3 includes eighteen button-tufts 20 disposed on the seat back 14. This pattern is similarly repeated on the seat base 12 of the vehicle seating assembly 10. However, it is also contemplated that there may be more or less rows of button-tufts 20, as known by one of ordinary skill in the art. Additionally, there may also be a different number of button-tufts 20 in each of the rows such that each row has the same amount of button-tufts 20, or more than four or less than three button-tufts 20 per row, as known by one of ordinary skill in the art in order to provide air flow to the vehicle passenger.

Referring again to the embodiment shown in FIG. 3, the button-tufts 20 form small indents 47 alternating with raised portions 48, relative to a planar extent of the top surface 22 of the passenger engagement surface in the coverstock 16 of the seat base 12 and the seat back 14. However, a depth of the indents 47 and a height of the raised portion 48 is minimal such that a vehicle passenger seated on the vehicle seating assembly 10 would feel as if the seat back 14 and the seat base 12 had a smooth top surface 22.

Referring again to the embodiment shown in FIG. 3, the vehicle seating assembly 10 may also include side bolsters 50, which are disposed on each side of the seat base 12 and the seat back 14. The bolsters 50 are shown free of button-tufts 20. However, it is also contemplated that any or all of the side bolsters 50 on either the seat base 12 or the seat back 14 may include button-tufts 20 in order to provide improved air flow to the vehicle passenger. Additionally, as shown in the embodiment illustrated in FIG. 3, a periphery 52 of both the seat back 14 and the seat base 12 is free from button-tufts 20. The arrangement as shown in FIG. 3 provides the vehicle passenger with comfort and improved air flow while keeping a uniform feel to the vehicle seating assembly 10. However, it is also contemplated that the button-tufts 20 may extend around the periphery 52 of both the seat base 12 and the seat back 14 or may be disposed on any portion of the seat base 12 or the seat back 14, as known by one of ordinary skill in the art, to provide optimal air flow to the vehicle passenger.

Referring now to the embodiment shown in FIGS. 4A and 4B, a lateral air channel 60 is disposed in the seat base 12 and the seat back 14 and is configured to allow air to flow from the fan 26 to the button-tuft 20. Specifically, the air channel 60 may extend through an intermediate portion 62 of the seat base 12 or may be disposed adjacent to a bottom surface 64 of the seat base 12. Additionally, the air channel 60 may further extend into the seat back 14. However, it is also contemplated that the seat back 14 may have a separate air channel 60, which extends through an intermediate portion 66 of the seat back 14 or may be disposed adjacent to a back surface 68 of the seat back 14.

Referring again to the embodiments shown in FIGS. 4A and 4B, the air channel 60 is operably coupled to the fan 26, which is disposed adjacent to the air channel 60 and below and behind a seat cushion portion 80 of the seat base 12. More specifically, the air channel 60 links the fan to the orifice 24 of the button-tuft 20. The fan 26 is configured to move air by either blowing air through the air channel 60 (see FIG. 4A) or by drawing air through the air channel 60 (see FIG. 4B). It is contemplated that the fan 26 may be configured to move air through both the portion of the air channel 60 disposed in the seat base 12 and the portion of the air channel 60 disposed in the seat back 14 such that only a single fan 26 is needed. However, it is also contemplated that the portion of the air channel 60 disposed in the seat base 12 is operably coupled to one fan 26, while the portion of the air channel 60 disposed in the seat back 14 is operably coupled to another fan 26. In the embodiment of the vehicle seating assembly 10 that includes multiple fans 26, the fans 26 may be configured to blow or draw air through the air channel 60 in conjunction with one another or may be configured to blow or draw air through the air channel 60 independently of one another.

Referring again to the embodiments shown in FIGS. 4A and 4B, the operation of the fan 26 may be controlled manually by the vehicle passenger or may be controlled automatically by a temperature sensor or other automatic means. Additionally, the fan 26 may be operably coupled with a vehicle ventilation system, such as an air conditioning system configured to cool the interior 40 of the vehicle 30, such that the button-tuft vented system 42 operates in conjunction with the vehicle ventilation system or the button-tuft vented system 42 may be configured to operate independently of the vehicle ventilation system.

Referring still again to the embodiments shown in FIGS. 4A and 4B, the air channel 60 is rigid such that the fan 26 can blow (see FIG. 4A) or pull (see FIG. 4B) air through the air channel 60 without the air channel 60 ballooning or collapsing. Additionally, the vehicle seating assembly 10 includes the seat cushion portion 80 disposed on top of the air channel 60. The seat cushion portion 80 includes an outer portion 82 forming a shell 84 and an inner portion 86 which is generally made of foam. In one embodiment, the foam is formed from polyurethane foam. However, it is also contemplated that the foam may be a soft foam, such as memory foam or other foam, as known by one of ordinary skill in the art. The outer portion 82 of the seat cushion portion 80 has a bottom section 88, which defines a portion of the air channel 60. The outer portion 82 may be a trim piece and is generally made of a non-permeable material, such as foam or other non-permeable material as known by one of ordinary skill in the art. The non-permeable nature of the outer portion 82 of the seat cushion portion 80 allows the air to be directed specifically through the orifice 24 and to the vehicle passenger and does not allow any of the air to escape through the seat cushion portion 80.

Referring again to the embodiment shown in FIGS. 4A and 4B, a top section 90 of the outer portion 82 of the seat cushion portion 80 begins parallel with the bottom section 88 of the seat cushion portion 80. When the top section 90 reaches a button-tuft 20, the top section 90 is pulled vertically downwards until the top section 90 comes in abutting contact with the bottom section 88. The top section 90 then again extends horizontally and parallel with the bottom section 88. The top section 90 and the bottom section 88 are in abutting contact such that no inner foam is disposed between the top section 90 and the bottom section 88, and define a button-tufting section 92 of the seat cushion portion 80 of the vehicle seating assembly 10. The button-tufting section 92 is adjacent to another button-tufting section 92 only having a button 100 disposed between them. Additionally, the depth of the button-tuft 20, measured by the length of the vertical portion of the outer portion 82 of the seat cushion 80, may be 15-50 mm, or alternatively 25-40 mm. However, it is also contemplated that the depth of the tufting may be more or less, as desired by one of ordinary skill in the art, to provide optimal comfort to a vehicle passenger while still providing optimal air flow to the passenger.

Referring now to the embodiment shown in FIG. 5, the button 100 is disposed on the top section 90 of the button-tufting section 92 such that a single button 100 is in abutting contact with and secured to two button-tufting sections 92. The button 100 is generally sewn onto the button-tufting sections 92. It is contemplated that the button 100 may include small holes in order to sew the button 100 onto the button-tufting section 92. It is also contemplated that the button 100 may be covered by some material such that the covering of the button 100 is sewn or otherwise fixed to the button-tufting section 92. However, it is also contemplated that the button 100 may be fixed to the button-tufting sections 92 in a variety of ways, such as glue or other adhesive, nails, or other affixing means, as known by one of ordinary skill in the art.

Figure 6:
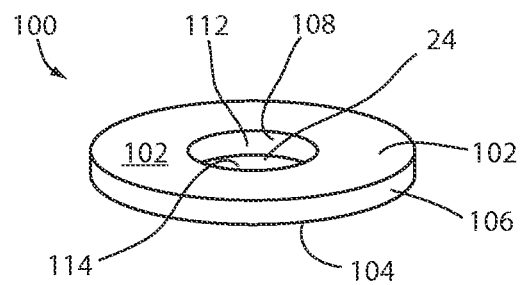
FIG. 6 is a side perspective view of a button for use with a button-tuft vented system.

Referring now to the embodiments shown in FIGS. 5 and 6, the button 100 is a round button having a circular top surface 102 and a bottom surface 104 with a connecting perimeter side wall 106. However, it is also contemplated that the button 100 may be of any other shape, including square-shaped, triangular-shaped, oval-shaped, or other shape, as known by one of ordinary skill in the art. The top surface 102 of the button 100 may be flat, as shown in FIG. 5. However, it is also contemplated that the top surface 102 of the button 100 may be rounded or concave down, as known by one of ordinary skill in the art, to provide additional comfort to the vehicle passenger.

Referring now to the embodiments shown in FIGS. 5 and 6, the button 100 also includes inner side walls 108, which define the orifice 24. The orifice 24 is centrally disposed in the button 100 and is configured to allow air to move from the air channel 60 through the orifice 24 and be delivered to the vehicle passenger. The orifice 24 is also configured to allow air to be drawn through the orifice 24 and through the air channel 60 in order to provide ventilation to the vehicle passenger. Moreover, the orifice 24 is also a round orifice 24 having a round top surface 112 and a bottom surface 114, while having the connecting inner side walls 108, which define the orifice 24. However, it is also contemplated that the orifice 24 may be of any shape, including oval-shaped, square-shaped, triangular-shaped, or any other shape, as known by one of ordinary skill in the art, in order to provide optimal air flow to a vehicle passenger.

Referring now to the embodiment shown in FIG. 6, the button 100 is made of a plastic polymer material and may be an injected molded plastic polymer material. However, it is also contemplated that the button 100 may be made of a foam or other non-permeable material, as known by one of ordinary skill in the art. It is also contemplated that the button 100 may be covered in a soft fabric in order to allow for the comfort of the vehicle passenger. Moreover, it is also contemplated that the button 100 may be covered in a material similar to the material used for the coverstock 16, which gives the vehicle seating assembly 10 a uniform look.

Figure 7:
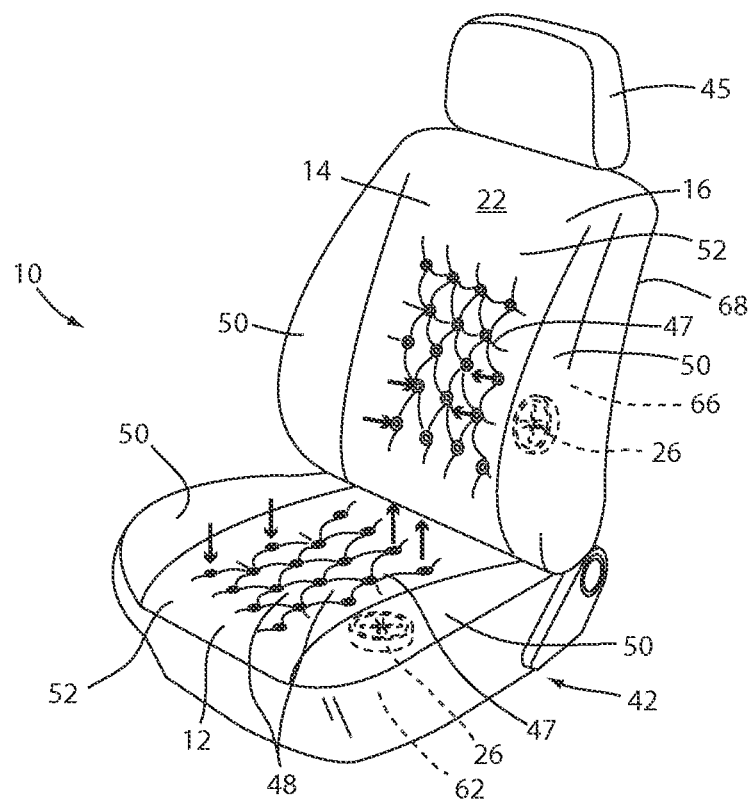
FIG. 7 is a front perspective view of the vehicle seat having the button-tuft vented system during operation.

Referring now to the embodiment shown in FIG. 7, when the button-tuft vented system 42 is activated, the fan 26 is turned on and moves (draws or blows) air through the air channel 60. The air then flows through the orifice 24 of the button 100. The air then flows through the coverstock 16, if the coverstock 16 is covering the button 100. The coverstock 16 may further include a plurality of perforations configured to be aligned with the orifice 24 in the button 100 in order to provide ventilation to the vehicle passenger. However, it is also contemplated that the coverstock 16 may be made of a permeable material such that air flows from the air channel 60 through the orifice 24 and through the coverstock 16 covering the button 100 and is delivered to the vehicle passenger. The outer portion 82 of the seat cushion portion 80 which defines a portion of the air channel 60, along with the bottom section 88 of the air channel 60 disposed inside of the seat base 12 or the seat back 14, provides rigidity to the button-tuft vented system 42 in order to prevent the air channel 60 or the seat cushion portion 80 from ballooning or collapsing during movement of air from the fan 26.

Yet another aspect of the present invention is to provide improved air flow technology in order to improve comfort to the vehicle passenger. Prior ventilation systems include vents on only a small portion of the seat or systems which move air through the foam from under the seat. Also, seats with climate control systems built-in require a spacer fabric to be sewn into the coverstock so that air can be distributed through the seat into the vehicle passenger. The spacer fabric gives the seat base and seat back a stiff feel which is not comfortable to the vehicle passenger. The present invention uses button-tufts that are often seen in chairs or other household furniture. The button-tufts are deep enough to not cause discomfort to the vehicle passenger, and the seating surface where the passenger engages the vehicle seating assembly still has a consistent feel. The button also includes inner walls defining the orifice, which is configured to provide air flow to the vehicle passenger. The fan is operably coupled to the air channel in order to move air from the fan through the air channel and through the orifice of the button in order to distribute and deliver the air flow to the vehicle passenger.

It is to be understood that variations and modifications can be made on the aforementioned structure without departing from the concepts of the present invention, and further it is to be understood that such concepts are intended to be covered by the following claims unless these claims by their language expressly state otherwise.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly comprising:
   a seat base;
   a seat back;
   a coverstock disposed over the seat base and the seat back;
   a plurality of button-tufts disposed on a top surface of at least one of the seat base and the seat back and operably coupled with the coverstock, wherein the plurality of button-tufts include an orifice extending through the button-tufts;
   a fan in communication with the orifice and configured to move air through the orifice, thereby providing air flow to a vehicle passenger resting on the coverstock.

2. The vehicle seating assembly of claim 1, wherein the orifice is centrally disposed in the button-tuft.

3. The vehicle seating assembly of claim 1, wherein the seat base includes a lateral air channel disposed adjacent to a bottom surface of the seat base.

4. The vehicle seating assembly of claim 1, wherein the plurality of button-tufts are arranged in a staggered pattern.

5. The vehicle seating assembly of claim 1, wherein a periphery of the seat base is free of button-tufts.

6. The vehicle seating assembly of claim 1, wherein the seat base includes a lateral air channel that extends through an intermediate portion of the seat base.

7. The vehicle seating assembly of claim 6, wherein the fan blows air through the lateral air channel and out the orifice of each button-tuft.

8. A vehicle seating assembly comprising:
   a seat base and seat back defining a seating surface;
   a button-tuft disposed on the seat base, wherein the button-tuft includes an orifice;
   a lateral air channel in communication with the orifice;
   a fan configured to move air through the orifice; and
   a coverstock operably coupled to the seat base and seat back by the button-tuft.

9. The vehicle seating assembly of claim 8, wherein the orifice is centrally disposed in the button-tuft.

10. The vehicle seating assembly of claim 8, wherein the button-tuft is recessed relative to a planar extent of the seating surface.

11. The vehicle seating assembly of claim 8, wherein a periphery of the seating surface is free of button-tufts.

12. The vehicle seating assembly of claim 8, wherein the fan is disposed below and behind the seating surface.

13. The vehicle seating assembly of claim 8, wherein the lateral air channel is disposed between a cushion portion of the seating surface and a trim piece of the seating surface.

14. The vehicle seating assembly of claim 13, wherein the fan blows air through the lateral air channel and out the orifice of the button-tuft.

15. A vehicle seating assembly comprising:
   a seat base;
   a seat back;
   a plurality of button-tufts disposed on the seat base and seat back;
   at least one orifice extending through the button-tufts;
   a fan operably coupled to the at least one orifice and configured to blow air through the seat base and seat back; and
   a coverstock operably coupled to the seat base and seat back by the plurality of button-tufts.

16. The vehicle seating assembly of claim 15, wherein the at least one orifice is centrally disposed in each of the plurality of button-tufts.

17. The vehicle seating assembly of claim 15, wherein the fan is also configured to draw air into the seat base and seat back through the at least one orifice of each of the plurality of button-tufts.

18. The vehicle seating assembly of claim 15, further comprising:
   an air channel that extends through the seat base and seat back and which links the fan with the at least one orifice of each of the plurality of button-tufts.

* * * * *